United States Patent [19]
Lucidarme et al.

[11] Patent Number: 5,952,758
[45] Date of Patent: Sep. 14, 1999

[54] ROTATING ELECTRICAL MACHINE WITH EXCITATION COILS, BY MAGNETS OR WITH DOUBLE EXCITATION

[75] Inventors: Jean Lucidarme, St. Genevieve des Bois; Abdelhamid Ben Ahmed, Saint Maur; Mohamed Gabsi, Cachan; Bernard Multon, Rennes; Eduardo Santander, Thiais; Emmanuel Hoang, Paris, all of France

[73] Assignee: Centre National de la Recherche Scientifique (C.N.R.S.), Paris, France

[21] Appl. No.: 09/044,902

[22] Filed: Mar. 20, 1998

[30] Foreign Application Priority Data

Mar. 20, 1997 [FR] France .................................. 97 03429

[51] Int. Cl.$^6$ .......................... H02K 19/00; H02K 21/00
[52] U.S. Cl. .................. 310/162; 310/49 R; 310/156; 310/168; 310/170; 310/258; 310/261; 310/268
[58] Field of Search .................... 310/49 K, 156, 310/162, 261, 268, 258, 168, 170

[56] References Cited

U.S. PATENT DOCUMENTS

| | | | |
|---|---|---|---|
| 4,012,652 | 3/1977 | Gilbert | 310/162 |
| 4,234,808 | 11/1980 | Geppert et al. | 310/49 R |
| 4,406,958 | 9/1983 | Palmero et al. | 310/49 R |
| 4,488,075 | 12/1984 | De Cesare | 310/49 R |
| 4,672,247 | 6/1987 | Madsen et al. | 310/49 R |
| 4,725,750 | 2/1988 | Welch | 310/49 R |
| 4,764,697 | 8/1988 | Christianes | 310/49 R |
| 5,038,063 | 8/1991 | Graber et al. | 310/115 |
| 5,396,140 | 3/1995 | Goldie et al. | 310/268 |

FOREIGN PATENT DOCUMENTS

| | | |
|---|---|---|
| 0 104 830 | 4/1984 | European Pat. Off. . |
| 0 556 425 | 8/1993 | European Pat. Off. . |

*Primary Examiner*—Elvin G. Enad
*Attorney, Agent, or Firm*—Young & Thompson

[57] ABSTRACT

A rotating electrical machine including a rotor (2), the magnetic circuit of which carries excitation members, and a stator (16), the magnetic circuit of which carries a stator coil. The magnetic circuit of the rotor includes a shaft (1) on which are mounted end flanges (3) and at least one toothed disk (4) disposed between the end flanges, the teeth of the toothed disk being regularly spaced at its periphery, and at least one annular member (9) mounted on the end flanges and having slots (10) regularly distributed at its periphery and in each of which is engaged one tooth of at least one toothed disk. The end flanges and the toothed disk are spaced apart by gaps in which excitation members (14, 15) are accommodated.

11 Claims, 5 Drawing Sheets

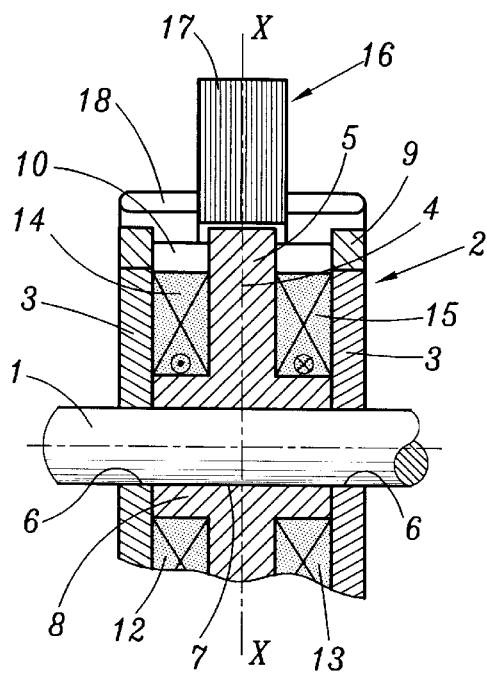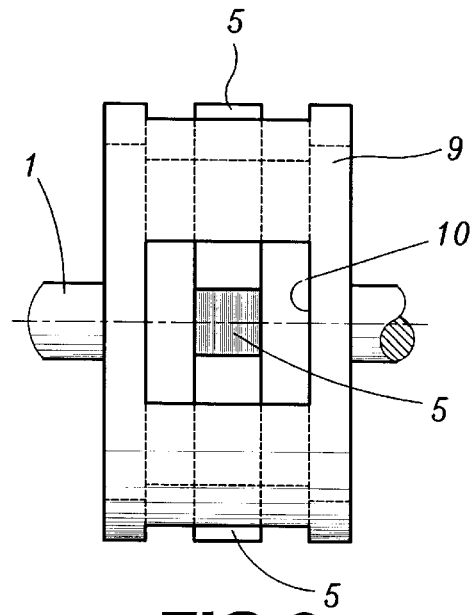
FIG.1  FIG.2
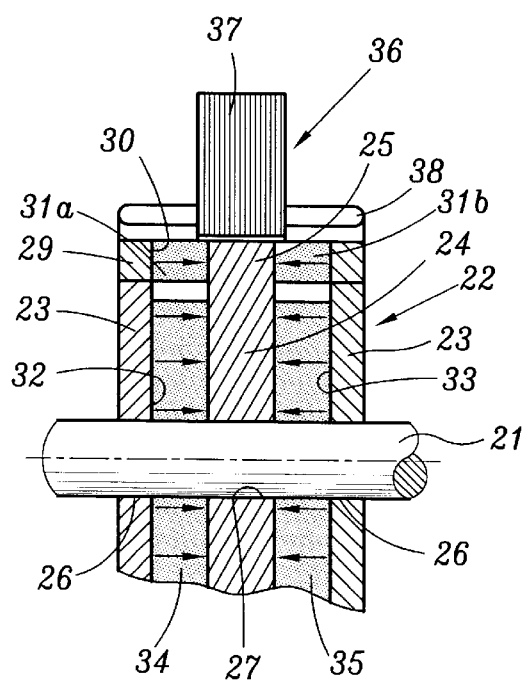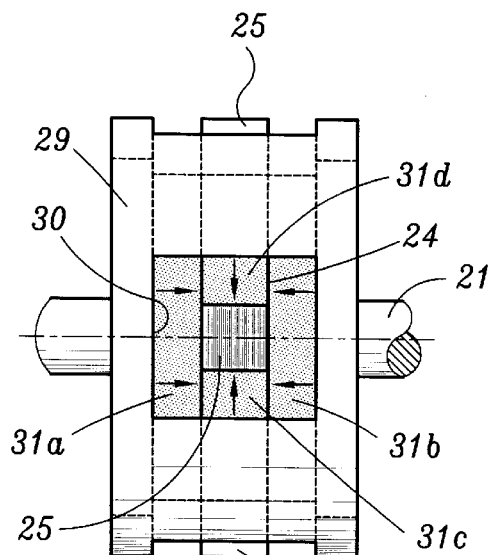
FIG.3  FIG.4

ROTATING ELECTRICAL MACHINE WITH EXCITATION COILS, BY MAGNETS OR WITH DOUBLE EXCITATION

BACKGROUND OF THE INVENTION

The present invention concerns rotating electrical machines and more particularly synchronous machines such as alternators for automobile vehicles, traction rotors, etcetera.

Alternators for automobile vehicles include claw pole machines including a stator core that carries a three-phase output or stator coil.

The rotor of the machine includes two polepieces with interleaved claws connected magnetically by a core around which a field coil is wound.

Other prior art alternators include two pole pieces with aligned claws between which is disposed a third polepiece having projections disposed between the claw poles.

Other prior art alternators of the double excitation type include a rotor formed of claw poles having lateral permanent magnets for concentrating the flux and an excitation coil disposed between the polepieces.

Claw pole rotating machines have high axial field components leading to high iron losses.

They are not suitable for juxtaposition of a plurality of machines to produce a machine of higher power.

SUMMARY OF THE INVENTION

The invention aims to remedy the drawbacks of prior art claw pole machines by creating a rotating electrical machine which, although simple to fabricate and to assemble, is particularly suitable for the juxtaposition of a plurality of machine elements to produce high-power machines.

It therefore consists in a rotating electrical machine including a rotor, the magnetic circuit of which carries excitation members, and a stator, the magnetic circuit of which carries a stator coil, characterized in that the magnetic circuit of the rotor includes a shaft on which are mounted end flanges and at least one toothed disk disposed between the end flanges, the teeth of the toothed disk being regularly spaced at its periphery and at least one annular member mounted on the end flanges and having slots regularly distributed at its periphery and in each of which is engaged one tooth of at least one toothed disk, the end flanges and said at least one toothed disk defining between them gaps in which excitation members are accommodated.

BRIEF DESCRIPTION OF THE DRAWINGS

The invention will be better understood from the following description given by way of example only and with reference to the appended drawings, in which:

FIG. 1 is a sectional view of part of a rotating electrical machine element of the invention with excitation coils;

FIG. 2 is a lateral elevation view of the rotor only of the machine from FIG. 1;

FIG. 3 is a sectional view of part of an electrical machine element with excitation magnets;

FIG. 4 is a lateral elevation view of the rotor of the machine from FIG. 3;

DESCRIPTION OF THE PREFERRED EMBODIMENT

Figure 5:
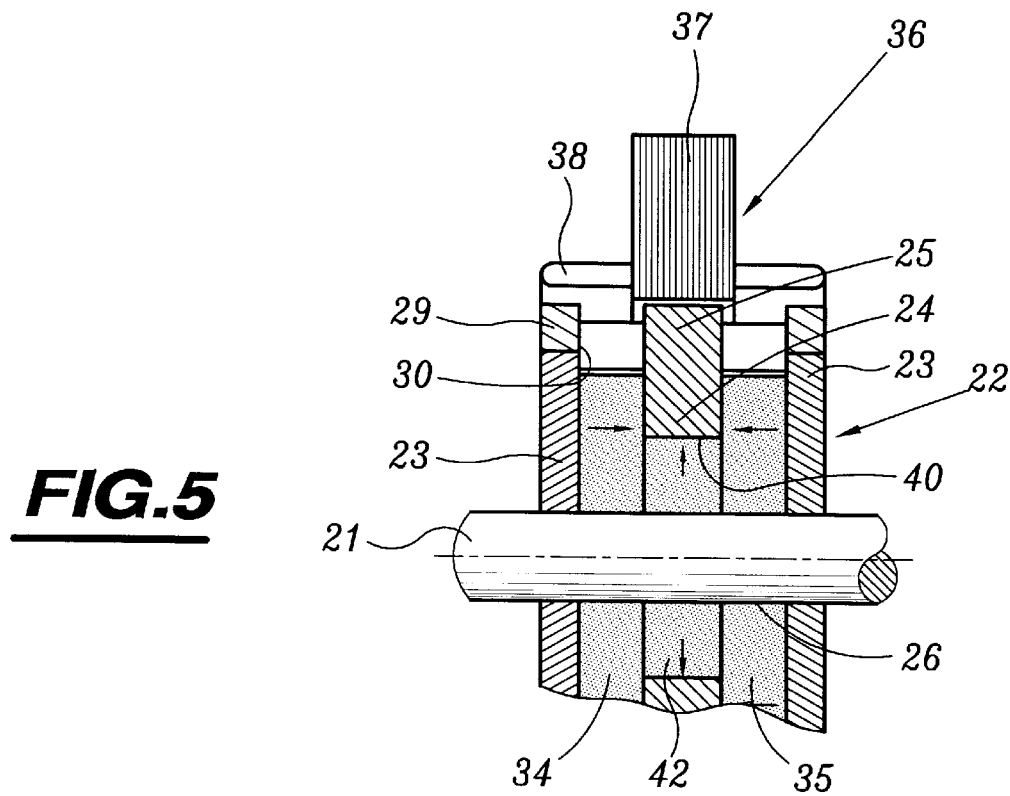
FIG. 5 is a sectional view of part of a variant of the machine from FIG. 3.

The electrical machine shown in FIGS. 1 and 2, for example an alternator, comprises a shaft 1 on which is mounted a rotor 2, the magnetic circuit of which includes circular end flanges 3 and an intermediate disk 4 with teeth 5 at regular intervals on its periphery.

The end flanges 3 and the toothed disk 4 have respective central bores 6 and 7 through which the shaft 1 passes and spacers 8 are disposed between the toothed disk 4 and the end flanges 3. The spacers are advantageously in the form of an integral hub extending on either side of the toothed disk 4 and surrounding the shaft 1.

The disk 4 and the end flanges 3 are of course constrained to rotate with the shaft 1 by appropriate means, not shown.

An annular member 9 is mounted on the end flanges 3 and incorporates slots 10 in which the teeth 5 of the toothed disk 4 engage, as can clearly be seen in FIG. 2.

The various members constituting the magnetic circuit of the rotor 2 are made of soft iron and are assembled together by appropriate assembly means, not shown, such as screws, sets of studs and nuts or the like.

The rotor 2 as described above includes two annular chambers 12 and 13 each defined by the toothed disk 4, one of the end flanges 3 and the annular member 9.

A torroidal excitation coil 14, 15 is mounted in each of the annular chambers.

The rotor 2 is surrounded by a stator 16 including a laminated magnetic circuit 17 on which is mounted a conventional three-phase armature coil 18.

The two excitation coils 14 and 15 of the rotor carry currents in opposite directions and the magnetic fluxes that they generate therefore close via the toothed disk 4.

The machine from FIG. 1 has an axis of symmetry X—X.

The operation of the part of the machine to the right or to the left of the axis X—X is similar to that of a conventional claw pole machine of short axial length.

It is well known that this type of machine has high axial field components leading to high iron losses, increasing with the axial length of the machine.

In the arrangement in accordance with the invention these losses are low because the symmetry of the machine about the axis X—X cancels any axial component in the transverse plane containing that axis and reduces by a factor of two the characteristic axial lengths of the machine.

Additionally, the end flanges 3 and more importantly the toothed disk 4 can be laminated.

In the latter case, the end flanges 3 can be assembled to the annular member 9 by means of complementary notches (not shown) in the edges of these parts so that they can nest one within the other.

The machine shown in FIGS. 3 and 4 is of the type with excitation magnets.

It includes a shaft 21 carrying a rotor 22 formed of two end flanges 23 and a toothed disk 24 having regularly spaced peripheral teeth 25.

The end flanges 23 and the toothed disk 24 include respective bores 26 and 27 through which the shaft 21 passes.

An annular member 29 is mounted on the end flanges 23 and includes slots 30 in which the teeth 25 of the toothed disk 24 engage.

As in the embodiment described with reference to FIGS. 1 and 2 the various members constituting the magnetic circuit of the rotor 22 are made of soft iron and are assembled together by appropriate assembly means, not shown.

The rotor 22 includes two annular chambers 32, 33 each defined by the toothed disk 24, one of the end flanges 23 and the annular member 29. An annular magnet 34, 35 is mounted in each of the annular chambers.

The magnets 34 and 35 are of opposite polarity.

As can clearly be seen in FIG. 4, the teeth 25 of the toothed disk 24 engaged in the slots 30 in the annular member 29 are surrounded by small magnets 31a, 31b, 31c, 31d of appropriate polarity.

All of the magnets are advantageously made from plastics material charged with particles of magnetic material magnetised in situ by appropriate means known in themselves.

The magnets 31 a, 31 b around the teeth 25 in the slots 30 can be dispensed with.

The rotor 22 is surrounded by a stator 36 including a laminated magnetic circuit 37 on which is mounted a conventional three-phase armature coil 38.

In this arrangement the members 23 and 24 can be entirely laminated.

In this embodiment the shaft 21 is made from an amagnetic material.

The machine shown in FIG. 5 is also a machine with excitation permanent magnets similar to the machine described with reference to FIG. 3 and differing from the latter only in that its toothed disk 24 has a central bore 40 the diameter of which is greater than the diameter of the shaft 21. An annular magnet 42 is disposed in the bore 40 between the shaft 21 and the toothed disk 24. In this case the shaft 21 is magnetic.

As in the embodiment described with reference to FIGS. 3 and 4 the teeth 25 of the toothed member 24 of the machine from FIG. 5 can be surrounded with permanent magnets accommodated in the slots 30.

It is also possible to dispose magnets between the toothed disk 24 and the annular member 29, accommodated in the gaps between the teeth 25 of the toothed member 24.

The magnets are simple parts and if the machines have a short axial length their available surface area produces a high concentration of excitation flux, possibly up to the point of saturation, even with ferrites and even in machines with a small number of poles.

The annular member 29 in the FIG. 3 embodiment and the annular member 49 in the FIG. 5 embodiment automatically assure that the magnets are held in place, which provides a natural solution to an important technological problem.

The machines described with reference to FIGS. 1 and 3 are short in length. To obtain higher performance a plurality of machines are juxtaposed.

Figure 6:
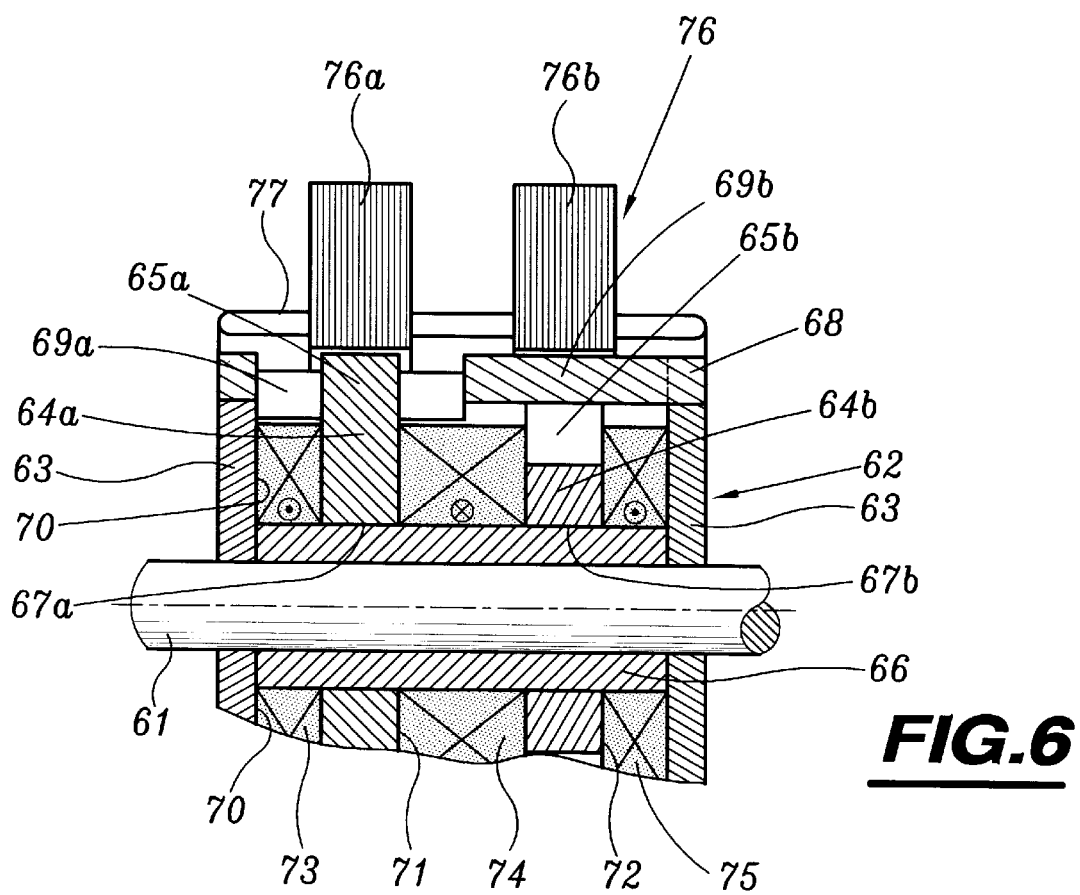
FIG. 6 is a sectional view of part of an electrical machine obtained by juxtaposing two machine elements from FIG. 1.

The machine shown in FIG. 6 is obtained by juxtaposing two machine elements like that from FIG. 1.

The machine includes an amagnetic material shaft 61 with which is constrained to rotate a rotor 62 having two end flanges 63 between which are disposed two toothed disks 64a and 64b with regularly spaced teeth 65a, 65b, the teeth 65a on the disk 64a being offset angularly relative to the teeth 65b on the disk 64b.

A magnetic material annular spacer 66 is mounted on the shaft 61 between the end flanges 63. The toothed disks 64a, 64b have respective bores 67a and 67b the diameter of which is equal to the outside diameter of the spacer 66. They are engaged on the spacer and fixed to the latter by any appropriate means.

A common annular member 68 is mounted or the end flanges 63 and incorporates slots 69a, 69b in which the respective teeth 65a, 65b of the toothed disks 64a, 64b engage.

With the toothed disks 64a and 64b, the end flanges 63 delimit three chambers 70, 71 and 72 in which are disposed torroidal coils 73, 74, 75 with adjacent coils wound in opposite directions.

The rotor 62 is engaged in a stator 75 having two laminated magnetic circuit members 76a, 76b each of which faces a corresponding toothed disk 64a, 64b. These magnetic circuit members carry a common three-phase stator armature coil 77.

Like the annular members of the embodiments described previously, the annular member 68 can be obtained by juxtaposing a plurality of mutually centred annular members, for example.

The arrangement just described with reference to FIG. 6 produces a machine by juxtaposing two machine elements which are intrinsically short in length and produce high flux densities.

The juxtaposition or series disposition along the rotor axis of a plurality of machine elements in accordance with the invention is facilitated by the structure of each of the machine elements and leads to a machine like that from FIG. 6 which is formed of two or more such machine elements.

The combination is of remarkable compactness and simplicity and has the following properties.

Regarding the stator, the notches of the machine elements are aligned and the coils are common. There is no coil head between the machine elements.

Regarding the rotor, not only is the shaft common to the two machine elements, but also the common intermediate parts such as the end flanges 2 of the juxtaposed machine elements can be dispensed with.

The composite machine from FIG. 6 features some degree of interleaving which simplifies the technological problems raised by juxtaposing two independent machines.

Figure 7:
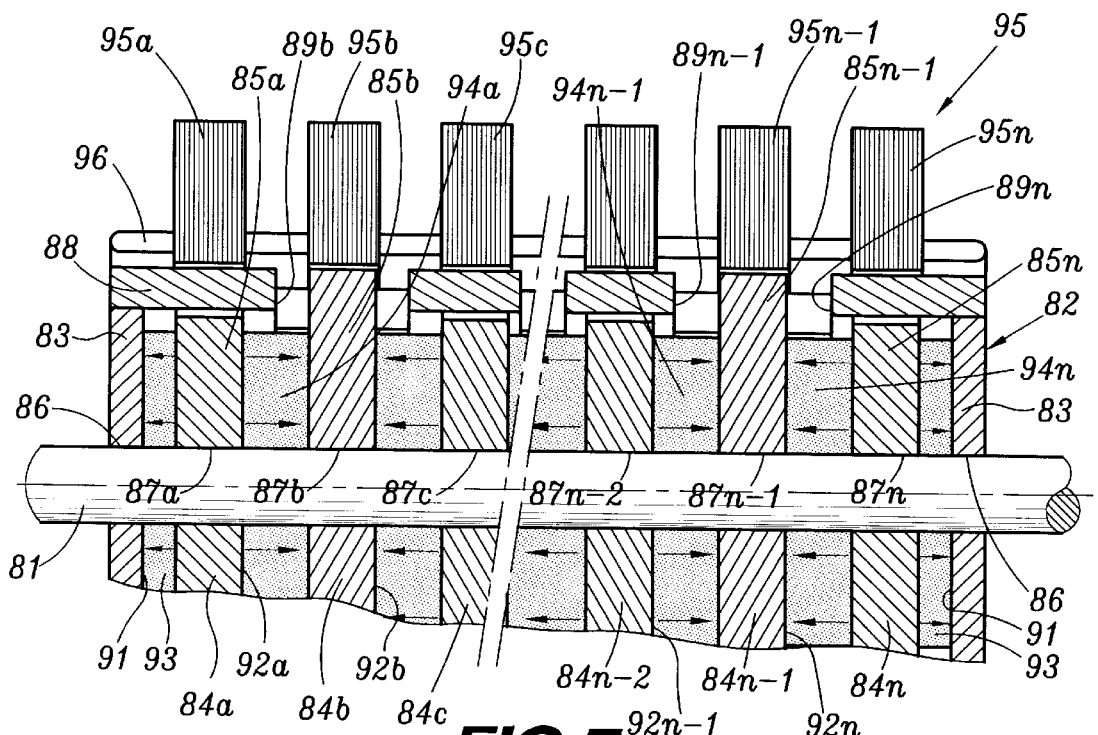
FIG. 7 is a sectional view of part of an electrical machine obtained by juxtaposing a plurality of machine elements from FIG. 3.

The machine shown in FIG. 7 is obtained by juxtaposing a large number of machine elements like the one shown in FIG. 3.

Figure 8:
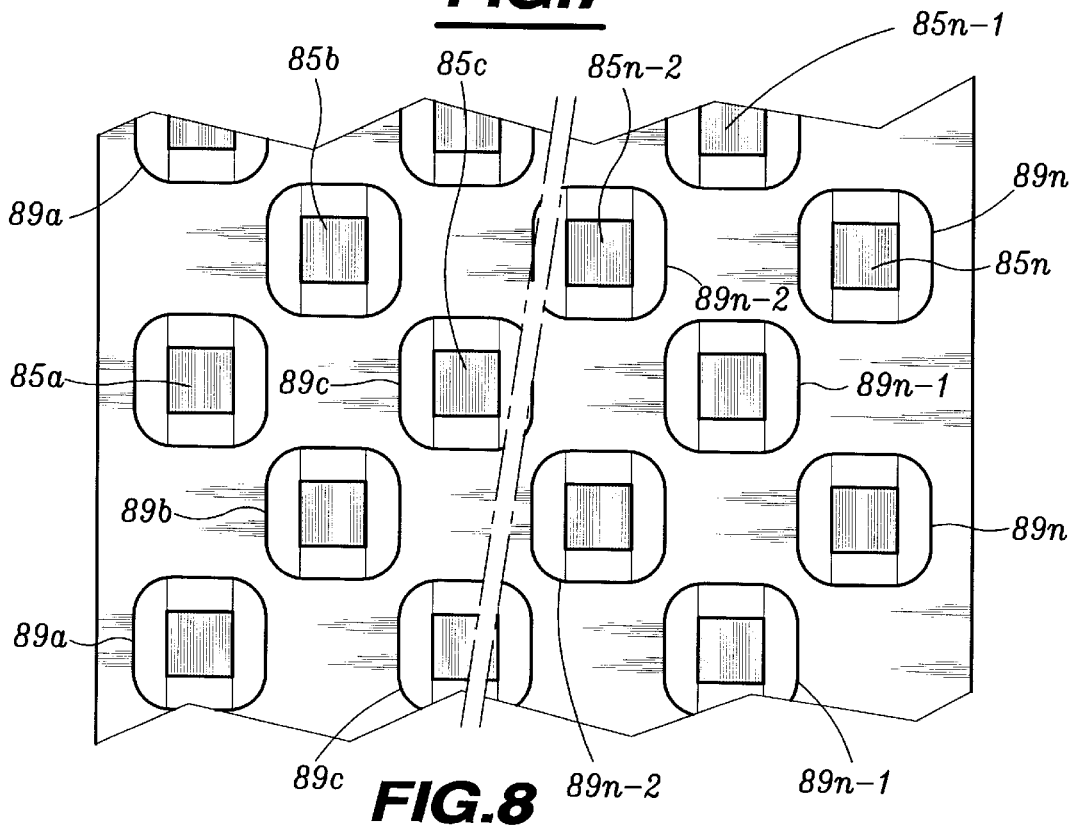
FIG. 8 is a developed view of part of the rotor of the machine from FIG. 7.

It has an amagnetic material common shaft 81 which carries a rotor 82 formed of two end flanges 83 and toothed disks 84a through 84n having teeth 85a through 85n offset from each other as shown in FIG. 8 which shows that the teeth 85a through 85n-1 of one toothed disk 84a through 84n-1 are angularly offset relative to the teeth 85b through 85n of the next toothed disk 84b through 84n.

The end flanges 83 and the toothed disks 84a through 84n have bores 86 and 87a through 87n through which the amagnetic shaft 81 passes. An annular member 88 is mounted on the end flanges 83 and has regularly distributed slots 89a through 89n at its periphery offset relative to each other in the manner shown in FIG. 8. The teeth 85a through 85n of the toothed disks 84a through 84n engage in the corresponding slots 89a through 89n.

Annular magnets 93 and 94a through 94n are disposed in the gaps between the end flanges 83 and the toothed disks 84a through 84n, defining with the shaft 81 and the slotted part 88 forming a jacket assembled to the end flanges and the toothed disks, on the one hand, two end chambers 91 between the first end flange 83 and the adjacent toothed disk 84a and between the second end flange 83 and the adjoining toothed disk 84n and, on the other hand, chambers 92a through 92n between the toothed disks 84a through 84n. The annular magnets are disposed so that the polarities of two adjoining magnets are of opposite sign or polarity.

The excitation magnets 93 in the end chambers 91 are half the thickness of the magnets 94a through 94n in the chambers 92a through 92n defined between the successive toothed disks 84a through 84n.

The rotor 82 just described is mounted in a stator 95 having as many magnetic circuit members 95a, through 95n as the rotor has toothed disks 84a through 84n. A common three-phase stator armature coil 96 is mounted on these magnetic circuit members.

In a variant that is not shown of the machine described with reference to FIGS. 7 and 8 annular stacks of stator laminations separated from the adjoining magnetic circuit members by airgaps are disposed in the gaps between the magnetic circuit members 95a through 95n of the stator.

Interleaved stator stacks of this kind increase the inductance of the field circuit, which facilitates power supply and defluxing.

The machine from FIGS. 7 and 8 consisting of juxtaposed machine elements of the type described with reference to FIG. 3 shows the ease with which a high-power electrical machine can be obtained by assembling and juxtaposing a large number of machine elements in accordance with the invention.

In the machine described with reference to FIGS. 7 and 8 the annular magnets can obviously be replaced by annular excitation coils.

Various ways of combining machine elements to obtain double excitation machines are described hereinafter but by no means exhaustively.

Figure 9:
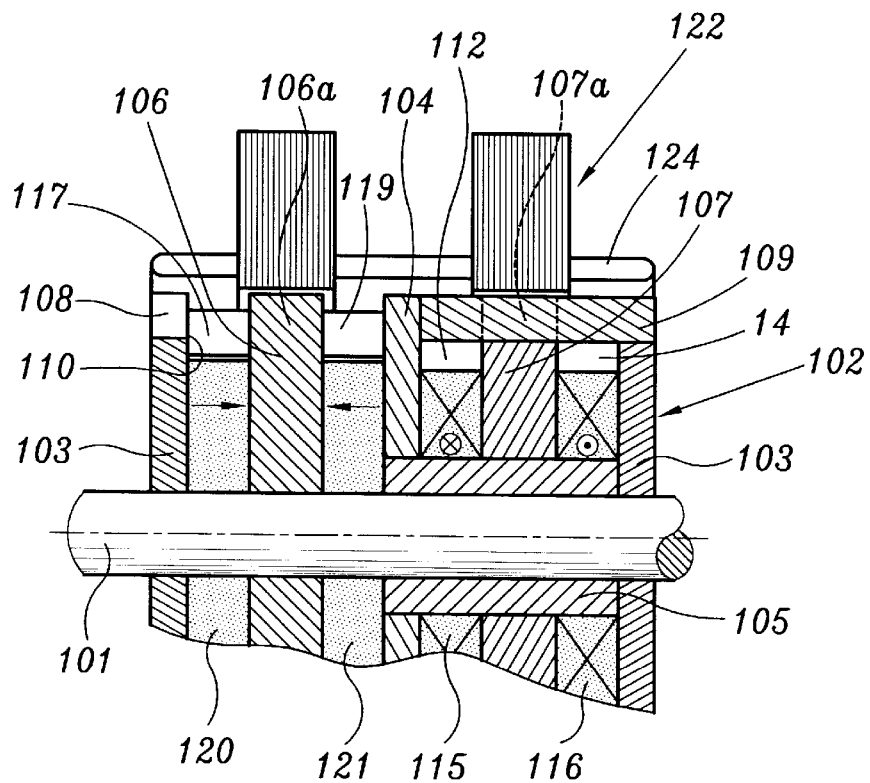
FIG. 9 is a sectional view of part of a double excitation machine.

The machine shown in FIG. 9 is a double excitation machine obtained by juxtaposing a machine element with excitation coils of the type described with reference to FIG. 1 and a machine element with excitation magnets of a type similar to the machine described with reference to FIG. 3.

The machine includes a shaft 101 on which is mounted a rotor 102 which includes end flanges 103 mounted directly on the shaft 101. An intermediate flange 104 connecting the machine element with excitation coils and the machine element with excitation magnets is mounted at one end of a tubular member 105 that is part of the machine with excitation coils. A toothed disk 106 that is part of the machine element with excitation magnets is mounted directly on the shaft 101 between one end flange 103 and the intermediate flange 104 and a toothed disk 107 that is part of the machine with excitation coils is mounted on the tubular member 105 between the intermediate flange 104 and the other end flange 103. Respective apertured annular members 108 and 109 are mounted on the first and second end flanges 103 and each incorporates slots such as the slot 110 in the member 108 in which the teeth 106a, 107a of the toothed disks 106, 107 engage.

The apertured annular members 108 and 109 abut against the intermediate flange 104.

Torroidal excitation coils 115 and 116 are disposed in the annular chambers 112 and 114 between the second end flange 103, the toothed disk 107 and the intermediate flange 104.

Annular magnets 120 and 121 of opposite polarity are disposed in the chambers 117 and 119 between the first end flange 103, the toothed disk 106 and the intermediate flange 104.

The rotor is mounted in a stator 122 including two laminated magnetic circuit members 123, 124 respectively associated with the toothed disks 106 and 107 and on which a three-phase stator armature coil 134 is mounted.

The machine retains the same structural features as the machine elements from FIGS. 1 and 5.

There is some degree of interleaving of the two machines such that the flux paths obtained are compatible. A system of rings and brushes (not shown) is obviously required but the combined machine has the symmetry of the machine elements.

Figure 10:
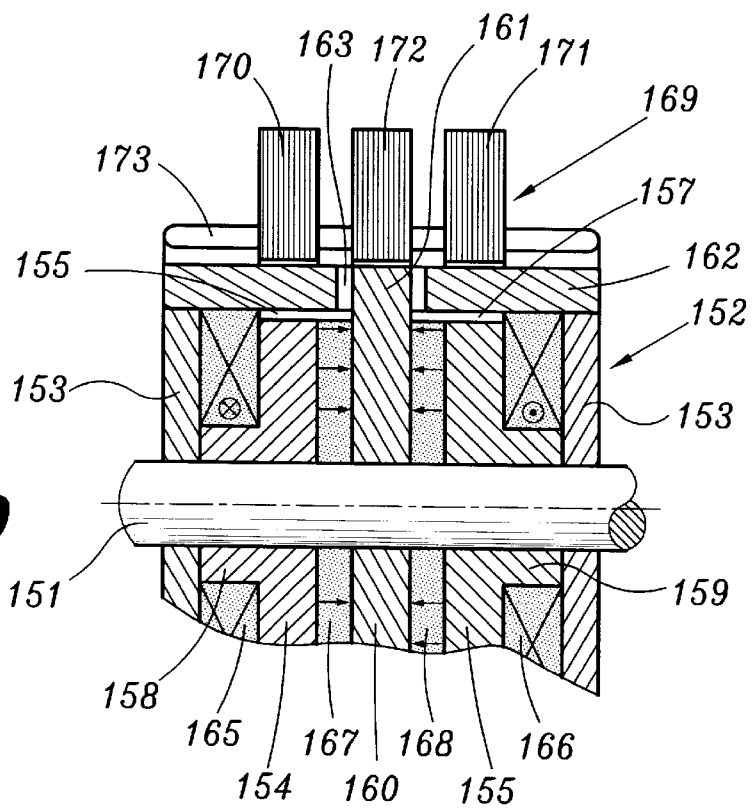
FIG. 10 is a sectional view of part of a double excitation machine obtained by juxtaposing two machine elements.

The machine represented in FIG. 10 is a machine with double excitation obtained by combining machine elements of the type described with reference to FIGS. 1 and 3 but in which the disposition of the component parts results from a different way of juxtaposing the machine elements.

The machine includes a shaft 151 on which is mounted a rotor 152 including two end flanges 153 and a toothed disk 154 facing one end flange and having teeth 155 and a disk 156 facing the other end flange having teeth 157. Each of the toothed disks 154 and 156 has a corresponding hub 158 and 159 in contact with the corresponding end flange 153.

An intermediate toothed disk 160 having teeth 161 and mounted directly on the shaft 151 is disposed between the toothed disks 154 and 156 associated with the end flanges 153.

An annular member 162 mounted on the end flanges 153 has slots 163 in which the teeth 155, 157 and 161 of the respective toothed disks 154, 156 and 160 engage, the series of slots respectively associated with the toothed disks 154, 156 and 160 being offset relative to each other in a similar manner to that shown in FIG. 8.

Excitation coils 165 and 166 are disposed in the gaps between the end flanges 153 and the toothed disks 154 and 156.

The annular magnets 167, 168 of opposite polarity are disposed in the spaces between the toothed disks 154 and 156, on the one hand, and the intermediate toothed disk 160, on the other hand.

Thus the elements of the machine with excitation coils are disposed on respective opposite sides of the elements of the machine with excitation magnets.

The rotor is associated with a stator 169 having three laminated magnetic circuit members 170, 171, 172 facing three toothed disks 154, 156 and 160 and on which a three-phase stator armature coil 173 is mounted.

Figure 11:
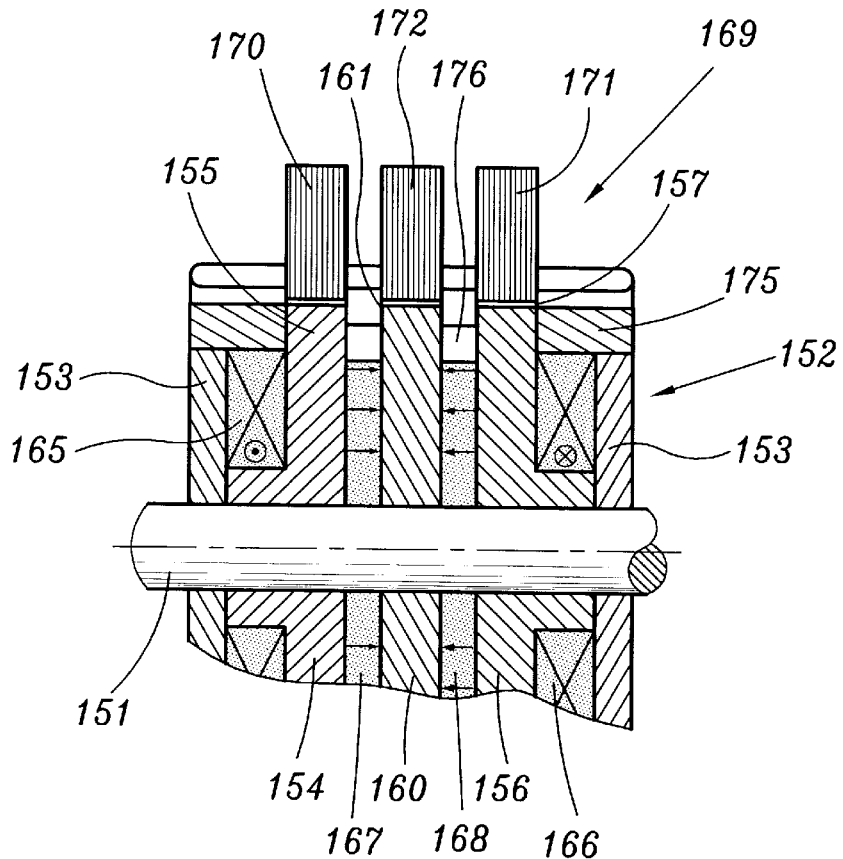
FIG. 11 is a sectional view of part of a variant of the machine from FIG. 10.

The structure of the machine shown in FIG. 11 is similar to that from FIG. 10 except that that toothed disks 154, 156 and 160 have respective teeth 155. 157 and 161 occupying identical angular positions and the rotor therefore includes an annular member 175 having a single series of slots 176 each of which engage simultaneously groups of three teeth 155, 157 and 161 of the three toothed disks.

This arrangement makes it possible for the flux from the magnets 167 and 168 to flow through the return circuit of the coils 165, 166.

The electrical machines described with reference to FIGS. 10 and 11 have a central portion formed of a machine element with excitation magnets and two lateral portions each formed of a part of a machine element with excitation coils.

Figure 12:
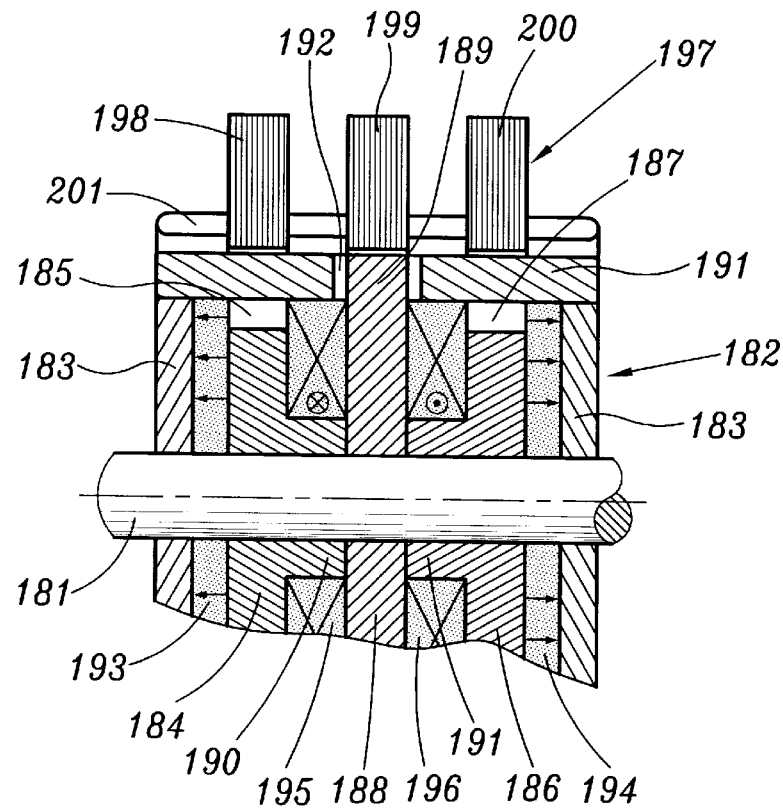
FIG. 12 is a sectional view of part of another variant of double excitation machine.

The machine represented in FIG. 12 differs from the machines from FIGS. 10 and 11 in that it has a central part formed of a machine element with excitation coils on respective opposite sides of which are disposed symmetrical portions of a machine element with excitation magnets.

The machine includes a shaft 181 carrying a rotor 182 which has two end flanges 183 between which are disposed a toothed disk 184 having teeth 185 facing the first end flange 183, a second toothed disk 186 having teeth 187 facing the second end flange 183 and an intermediate toothed disk 188 having teeth 189 held between the first and second toothed disks 184 and 186 by spacer hubs 190, 191 in one piece with the disk 184 and the disk 186, respectively.

An apertured annular member 191 is mounted on the end flange 183 and the toothed disks 184, 186 and 188 and includes slots 192 in which the teeth 189 of the toothed disks 184, 186 and 188 engage.

The slots associated with the teeth of the toothed disks 184, 186 and 188 are offset angularly relative to each other.

A magnet 193, 194 is disposed between end flange 183 and its associated toothed disk 184, 186. Annular coils 195, 196 are disposed between the toothed disks 184 and 186 and the intermediate toothed disk 188.

The magnets 193 and 194 are also of opposite polarity.

The rotor is associated with a stator 197 including three laminated circuit members 198, 199, 200 on which a three-phase coil 201 is mounted.

The juxtaposition of machines as represented in FIGS. 9 through 12 based on two and three machine elements can naturally be generalised to structures including a larger number of machine elements.

For example, the two terminal magnets of the structure from FIG. 7 can be replaced by coils as described with reference to FIG. 10.

Although in the examples described with reference to the drawings the electrical machines are essentially three-phase machines, the invention applies equally well to machines with different numbers of phases.

The machines just described have a number of advantages.

The machines with excitation coils or magnets have symmetry relative to a median axis that reduces axial stator fields.

They are simple and robust.

In the case of machines with excitation magnets, the excitation can feature a very high concentration of flux, in which case the ferrite can always be replaced by less costly materials.

The magnets can be very simple in shape and their design procures mechanical strength.

The juxtaposition of the machine elements is a natural one enabling the use of common rotor and stator members.

The use of double excitation (i.e. magnets and coils) assures nominal excitation means of the magnets and regulation of the flux by means of the coils. The dimensions of the coils can therefore be small.

The double excitation problem is known to be a difficult one because the presence of magnets is often incompatible with the presence of field coils.

The invention provides a particular type of double excitation machine in which the fluxes generated by the magnets and by the excitation coils of the rotor are compatible, that is to say have independent paths, and can add or subtract according to the direction of the excitation current.

The magnets with a permeability close to that of air can be in series with coils whereas a parallel arrangement short-circuits them.

The use of structures in accordance with the invention solves this problem.

The embodiments of machines described above provide solutions appropriate to the intended applications.

There are many applications of machines in accordance with the invention.

High-output alternators can be produced.

Traction motors can also be produced, for example for automobiles, by assembling n machine elements to obtain machines that are robust, of simple construction and having a high torque per unit mass.

The invention also applies to the production of motors operating at constant power over a wide range of speed.

We claim:

1. A rotating electrical machine including a rotor with a magnetic circuit carrying excitation members, and a stator with a magnetic circuit carrying a stator coil, wherein the magnetic circuit of the rotor includes a shaft on which are mounted end flanges and at least one toothed disk disposed between the end flanges, the teeth of the toothed disk being regularly spaced at its periphery, and at least one annular member mounted on the end flanges and having slots regularly distributed at its periphery and in each of which is engaged one tooth of said at least one toothed disk, the end flanges and said at least one toothed disk being spaced apart by gaps in which said excitation members are accommodated.

2. An electrical machine according to claim 1 wherein the excitation members are annular magnets of opposite polarity.

3. An electrical machine according to claim 2 wherein the end flanges and the toothed disk are mounted directly on the shaft, said shaft comprising an amagnetic material.

4. An electrical machine according to claim 3, further comprising magnets between each said tooth of said toothed disk and walls of the corresponding slot in which said tooth is engaged.

5. An electrical machine according to claim 2 wherein the machine is obtained by juxtaposing n electrical machines having a toothed disk, the teeth of one toothed disk being offset angulary relative to the teeth of the next toothed disk, a common annular member with slots in which the teeth of the toothed disks respectively are engaged being mounted on the end flanges, and annular excitation members are disposed between the end flanges and the toothed disks neighboring the latter on the one hand and on respective opposite sides of the successive toothed disks on the other hand, and wherein the stator of the machine includes n magnetic circuit members facing the toothed disks and carrying a common stator coil.

6. An electrical machine according to claim 5 wherein the excitation members are magnets wherein the magnets between the end flanges and the toothed disks are half the thickness of the magnets between the successive toothed disks, and wherein the successive magnets have opposite polarities.

7. An electrical machine according to claim 6 wherein the magnetic circuit members of the stator are separated by respective gaps in which are provided annular stacks of stator laminations separated from adjacent magnetic circuit members by air gaps.

8. An electrical machine according to claim 1 wherein the stator includes three magnetic circuit members facing the toothed disk and on which a stator coil is mounted.

9. An electrical machine including a rotor with a magnetic circuit carrying excitation members, and a stator with a magnetic circuit carrying a stator coil, wherein the magnetic circuit of the rotor includes a shaft on which are mounted end flanges and at least one toothed disk disposed between the end flanges, the teeth of the toothed disk being regularly spaced at its periphery, and at least one annular member mounted on the end flanges and having slots regularly distributed at its periphery and in each of which is engaged one tooth of said at least one toothed disk, the end flanges and said at least one toothed disk being spaced apart by gaps in which said excitation members are accommodated wherein the shaft is magnetic and wherein the toothed disk has a central bore with a diameter greater than a diameter of the shaft an annular magnet being disposed between the shaft and the toothed disk in the central bore thereof.

10. An electrical machine according to claim 9, further comprising magnets between each said tooth of said toothed disk and walls of the corresponding slot in which said tooth is engaged.

11. An electrical machine according to claim 1, wherein the excitation members are annular coils.

* * * * *